(12) United States Patent
Myers et al.

(10) Patent No.: US 8,897,506 B2
(45) Date of Patent: *Nov. 25, 2014

(54) IMAGE CLASSIFICATION AND INFORMATION RETRIEVAL OVER WIRELESS DIGITAL NETWORKS AND THE INTERNET

(71) Applicant: FaceDouble, Inc., San Diego, CA (US)

(72) Inventors: Charles A. Myers, La Jolla, CA (US); Alex Shah, San Diego, CA (US)

(73) Assignee: FaceDouble, Inc., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/674,019

(22) Filed: Nov. 10, 2012

(65) Prior Publication Data

US 2013/0070976 A1    Mar. 21, 2013

Related U.S. Application Data

(63) Continuation of application No. 12/555,789, filed on Sep. 8, 2009, now Pat. No. 8,311,294, which is a continuation of application No. 12/138,559, filed on Jun. 13, 2008, now Pat. No. 7,587,070, which is a continuation-in-part of application No. 11/534,667, filed on Sep. 24, 2006, now Pat. No. 7,450,740.

(60) Provisional application No. 60/944,474, filed on Jun. 15, 2007, provisional application No. 60/721,226, filed on Sep. 28, 2005.

(51) Int. Cl.
*G06K 9/00* (2006.01)
*G06F 17/30* (2006.01)

(52) U.S. Cl.
CPC .................................. *G06K 9/00288* (2013.01)
USPC .......................................... 382/118; 707/705

(58) Field of Classification Search
CPC .......... G06K 9/00288; G06K 9/00221; G06K 9/00281; G06K 9/6201; H04N 1/00307; G06F 17/30067; G06F 17/30247
USPC ................. 382/115–118, 181, 218, 305, 312; 707/104.1, 705; 455/410
See application file for complete search history.

(56) References Cited

U.S. PATENT DOCUMENTS 6,940,545 B1 * 9/2005 Ray et al. ................... 348/222.1
7,428,321 B1    9/2008 Shah et al.

(Continued)

FOREIGN PATENT DOCUMENTS

WO    WO2005091211    9/2005
WO    WO2006053375    5/2006

OTHER PUBLICATIONS

Complaint, *FaceDouble v. Coca Cola*, case No. 10-cv-0485 IEG RBB.

(Continued)

*Primary Examiner* — Kanjibhai Patel
(74) *Attorney, Agent, or Firm* — Clause Eight IPS; Michael Catania

(57) ABSTRACT

A method and system for matching an unknown facial image of an individual with an image of a celebrity using facial recognition techniques and human perception is disclosed herein. The invention provides a internet hosted system to find, compare, contrast and identify similar characteristics among two or more individuals using a digital camera, cellular telephone camera, wireless device for the purpose of returning information regarding similar faces to the user The system features classification of unknown facial images from a variety of internet accessible sources, including mobile phones, wireless camera-enabled devices, images obtained from digital cameras or scanners that are uploaded from PCs, third-party applications and databases. Once classified, the matching person's name, image and associated meta-data is sent back to the user. The method and system uses human perception techniques to weight the feature vectors.

16 Claims, 14 Drawing Sheets

(56) References Cited

U.S. PATENT DOCUMENTS

| | | | |
|---|---|---|---|
| 7,450,740 | B2 | 11/2008 | Shah et al. |
| 7,565,139 | B2 | 7/2009 | Neven, Sr. et al. |
| 7,587,070 | B2 | 9/2009 | Myers et al. |
| 7,599,527 | B2 | 10/2009 | Shah et al. |
| 7,606,790 | B2 * | 10/2009 | Levy .................................. 1/1 |
| 7,668,348 | B2 | 2/2010 | Shah et al. |
| 7,751,805 | B2 | 7/2010 | Neven et al. |
| 7,760,917 | B2 | 7/2010 | Vanhoucke et al. |
| 7,783,085 | B2 | 8/2010 | Perlmutter et al. |
| 7,831,069 | B2 | 11/2010 | Shah et al. |
| 7,885,435 | B2 | 2/2011 | Shah et al. |
| 7,907,755 | B1 | 3/2011 | Perlmutter et al. |
| 7,962,128 | B2 | 6/2011 | Neven et al. |
| 8,199,980 | B2 | 6/2012 | Shah et al. |
| 8,311,289 | B2 | 11/2012 | Vanhoucke et al. |
| 8,311,294 | B2 | 11/2012 | Myers et al. |
| 8,341,412 | B2 | 12/2012 | Conwell |
| 8,369,570 | B2 | 2/2013 | Myers et al. |
| 8,421,872 | B2 | 4/2013 | Neven, Sr. |
| 2009/0060289 | A1 | 3/2009 | Shah et al. |
| 2011/0182485 | A1 | 7/2011 | Shochat et al. |
| 2013/0070976 | A1 | 3/2013 | Myers et al. |
| 2013/0142402 | A1 | 6/2013 | Myers et al. |

OTHER PUBLICATIONS

Plaintiff's Answer to Defendant Crispin's Counterclaim, *FaceDouble* v. *Coca Cola*, case No. 10-cv-0485 IEG RBB.
Plaintiff's Answer to Defendant Coca-Cola's Counterclaim, *FaceDouble* v. *Coca Cola*, case No. 10-cv-0485 IEG RBB.
Plaintiff's Response to Motion to Continue Preliminary Injunction, *FaceDouble* v. *Coca Cola*, case No. 10-cv-0485 IEG RBB.
Defendants' Memorandum in Support of Motion to Continue Preliminary Injunction, *FaceDouble* v. *Coca Cola*, case No. 10-cv-0485 IEG RBB.
Plaintiff's Motion for Preliminary Injunction, *FaceDouble* v. *Coca Cola*, case No. 10-cv-0485 IEG RBB.
Defendant Crispin's Answer, Affirmative Defenses and Counterclaims, *FaceDouble* v. *Coca Cola*, case No. 10-cv-0485 IEG RBB.
Defendant Coca-Cola's Answer and Counterclaims, *FaceDouble* v. *Coca Cola*, case No. 10-cv-0485 IEG RBB.
Defendant's Opposition to the Motion for Preliminary Injunction, *FaceDouble* v. *Coca Cola*, case No. 10-cv-0485 IEG RBB.
Final Office Action for U.S. Appl. No. 13/252,139, mailed on Mar. 22, 2013.
*Facedouble, Inc.* v. *Face.com*, Case No. 3:12-CV-01584-DMS-MDD, Defendant's Amended Invalidity Contentions, Feb. 28, 2014.
*Facedouble, Inc.* v. *Face.com*, Case No. 3:12-CV-01584-DMS-MDD, Defendant's Amended Invalidity Contentions, and exhibits Feb. 28, 2014.
Newsam et al., Category-Based Image Retrieval, 2001, IEEE, pp. 596-599.
Zhang et al., Relevance Feedback and Learning in Content-Based Image Search, 2003, World Wide Web: Internet and Web Information Systems, 6, 131-155, The Netherlands.
Zhang et al., Relevance Feedback and Learning in Content-Based Image Search, Microsoft Research, China.
*Facedouble, Inc.* v. *Face.com*, Case No. 3:12-CV-01584-DMS-MDD, Facedouble's Supplemental Response to Face.com's Interrogatory 2, Feb. 25, 2014.
Complaint, *FaceDouble, Inc.* vs. *VIZI Labs, Inc.*, Case No. '12CV1584WQHMDD, Filed Jun. 26, 2012.
*FaceDouble, Inc.* vs. *VIZI Labs, Inc.*, Case No. '12CV1584WQHMDD, Defendant Face.Com's Preliminary Claim Constructions and Identification of Extrinsic Evidence Pursuant to Patent L.R. 4.1(A)-(B), dated Jan. 13, 2014.
*FaceDouble, Inc.* vs. *VIZI Labs, Inc.*, Case No. '12CV1584WQHMDD, First Amended Complaint for Patent Infringement and Demand for Jury Trial, dated May 14, 2013.
*FaceDouble, Inc.* vs. *VIZI Labs, Inc.*, Case No. '12CV1584WQHMDD, FaceDouble's Initial Disclosure of Asserted Claims and Infringement Contentions Under Local Patent Rule 3.1, dated Nov. 22, 2013.
*FaceDouble, Inc.* vs. *VIZI Labs, Inc.*, Case No. '12CV1584WQHMDD, FaceDouble's Responses to Face.Com's First Set of Interrogatories, Filed Dec. 20, 2013.
*FaceDouble, Inc.* vs. *VIZI Labs, Inc.*, Case No. '12CV1584WQHMDD,FaceDouble's Amended Initial Disclosure of Asserted Claims and Infringement Contentions Under Local Patent Rule 3.1, dated Nov. 22, 2013.
*FaceDouble, Inc.* vs. *VIZI Labs, Inc.*, Case No. '12CV1584WQHMDD, Plaintiff FaceDouble's Preliminary Proposed Construction of Claim Terms Pursuant to Patent Local Rule 4.1, dated Jan. 13, 2014.
*FaceDouble, Inc.* vs. *VIZI Labs, Inc.*, Case No. '12CV1584WQHMDD, Joint Claim Construction Chart, dated Feb. 13, 2014.
*FaceDouble, Inc.* vs. *VIZI Labs, Inc.*, Case No. '12CV1584WQHMDD, Joint Claim Construction Worksheet, dated Feb. 13, 2014.
*FaceDouble, Inc.* vs. *VIZI Labs, Inc.*, Case No. '12CV1584WQHMDD, Joint Hearing Statement, dated Feb. 13, 2014.
*FaceDouble, Inc.* vs. *VIZI Labs, Inc.*, Case No. '12CV1584WQHMDD, Defendant Face.com's Invalidity Contentions, Dated Jan. 2, 2014.
*FaceDouble, Inc.* vs. *VIZI Labs, Inc.*, Case No. '12CV1584WQHMDD, Invalidity Contentions—'070 Invalidity Chart Exhibit A1-A3, Dated Jan. 2, 2014.
*FaceDouble, Inc.* vs. *VIZI Labs, Inc.*, Case No. '12CV1584WQHMDD, Invalidity Contentions—'070 Invalidity Chart Exhibit A4-A7, Dated Jan. 2, 2014.
*FaceDouble, Inc.* vs. *VIZI Labs, Inc.*, Case No. '12CV1584WQHMDD, Invalidity Contentions—'070 Invalidity Chart Exhibit A8-A12, Dated Jan. 2, 2014.
*FaceDouble, Inc.* vs. *VIZI Labs, Inc.*, Case No. '12CV1584WQHMDD, Invalidity Contentions—'070 Invalidity Chart Exhibit A13-A20, Dated Jan. 2, 2014.
*FaceDouble, Inc.* vs. *VIZI Labs, Inc.*, Case No. '12CV1584WQHMDD, Invalidity Contentions—'070 Invalidity Chart Exhibit A21-A24, Dated Jan. 2, 2014.
*FaceDouble, Inc.* vs. *VIZI Labs, Inc.*, Case No. '12CV1584WQHMDD, Invalidity Contentions—'070 Invalidity Chart Exhibit A25-A26, Dated Jan. 2, 2014.
*FaceDouble, Inc.* vs. *VIZI Labs, Inc.*, Case No. '12CV1584WQHMDD, Invalidity Contentions—'070 Invalidity Chart Exhibit A27, Dated Jan. 2, 2014.
*FaceDouble, Inc.* vs. *VIZI Labs, Inc.*, Case No. '12CV1584WQHMDD, Invalidity Contentions—'070 Invalidity Chart Exhibit A28-A29, Dated Jan. 2, 2014.

* cited by examiner

200

FIG. 12
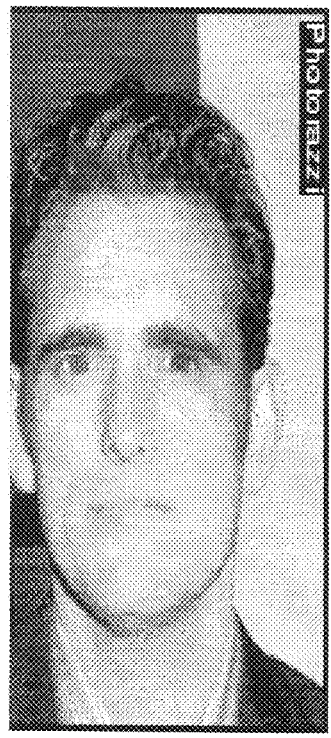
Matt Dillon
lealy in There's Something
About Mary (1998)
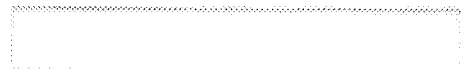
212
220

IMAGE CLASSIFICATION AND INFORMATION RETRIEVAL OVER WIRELESS DIGITAL NETWORKS AND THE INTERNET

CROSS REFERENCES TO RELATED APPLICATIONS

The Present Application is a continuation application of U.S. patent application Ser. No. 12/555,789, filed on Sep. 8, 2009, which is a continuation application of U.S. patent application Ser. No. 12/138,559, filed on Jun. 13, 2008, now U.S. Pat. No. 7,587,070, issued on Sep. 8, 2009, which claims priority to U.S. Provisional Patent No. 60/944,474, filed on Jun. 15, 2007, and which is a continuation-in-part application of U.S. patent application Ser. No. 11/534,667, filed on Sep. 24, 2006, now U.S. Pat. No. 7,450,740, which claimed priority to U.S. Provisional Patent Application No. 60/721,226, filed Sep. 28, 2005, all of which are hereby incorporated by reference in their entireties.

STATEMENT REGARDING FEDERALLY SPONSORED RESEARCH OR DEVELOPMENT

Not Applicable

BACKGROUND OF THE INVENTION

1. Field of the Invention

The present invention relates to a method and system for classification of digital facial images received over wireless digital networks or the Internet and retrieval of information associated with classified image.

2. Description of the Related Art

Classification of facial images using feature recognition software is currently used by various government agencies such as the Department of Homeland Security (DHS) and the Department of Motor Vehicles (DMV) for detecting terrorists, detecting suspected cases of identity fraud, automating border and passport control, and correcting mistakes in their respective facial image databases. Facial images stored in the DMV or DHS are digitized and stored in centralized databases, along with associated information on the person. Examples of companies that provide biometric facial recognition software include Cross Match Technologies, Cognitec, Cogent Systems, and Iridian Technologies; of these, Cognitec also provides a kiosk for digitally capturing images of people for storage into their software.

Your face is an important part of who you are and how people identify you. Imagine how hard it would be to recognize an individual if all faces looked the same. Except in the case of identical twins, the face is arguably a person's most unique physical characteristic. While humans have had the innate ability to recognize and distinguish different faces for millions of years, computers are just now catching up.

Visionics, a company based in New Jersey, is one of many developers of facial recognition technology. The twist to its particular software, FACEIT, is that it can pick someone's face out of a crowd, extract that face from the rest of the scene and compare it to a database full of stored images. In order for this software to work, it has to know what a basic face looks like. Facial recognition software is based on the ability to first recognize faces, which is a technological feat in itself, and then measure the various features of each face.

If you look in the mirror, you can see that your face has certain distinguishable landmarks. These are the peaks and valleys that make up the different facial features. Visionics defines these landmarks as nodal points. There are about 80 nodal points on a human face. A few of the nodal points that are measured by the FACEIT software: distance between eyes; width of nose; depth of eye sockets; cheekbones; Jaw line; and chin. These nodal points are measured to create a numerical code that represents the face in a database. This code is referred to as a faceprint and only fourteen to twenty-two nodal points are necessary for the FACEIT software to complete the recognition process.

Facial recognition methods may vary, but they generally involve a series of steps that serve to capture, analyze and compare your face to a database of stored images. The basic process that is used by the FACEIT software to capture and compare images is set forth below and involves Detection, Alignment, Normalization, Representation, and Matching. To identify someone, facial recognition software compares newly captured images to databases of stored images to see if that person is in the database.

Detection is when the system is attached to a video surveillance system, the recognition software searches the field of view of a video camera for faces. If there is a face in the view, it is detected within a fraction of a second. A multi-scale algorithm is used to search for faces in low resolution. The system switches to a high-resolution search only after a head-like shape is detected.

Alignment is when a face is detected, the system determines the head's position, size and pose. A face needs to be turned at least thirty-five degrees toward the camera for the system to register the face.

Normalization is when the image of the head is scaled and rotated so that the head can be registered and mapped into an appropriate size and pose. Normalization is performed regardless of the head's location and distance from the camera. Light does not impact the normalization process.

Representation is when the system translates the facial data into a unique code. This coding process allows for easier comparison of the newly acquired facial data to stored facial data.

Matching is when the newly acquired facial data is compared to the stored data and linked to at least one stored facial representation.

The heart of the FACEIT facial recognition system is the Local Feature Analysis (LFA) algorithm. This is the mathematical technique the system uses to encode faces. The system maps the face and creates the faceprint. Once the system has stored a faceprint, it can compare it to the thousands or millions of faceprints stored in a database. Each faceprint is stored as an 84-byte file.

One of the first patents related to facial recognition technology is Rothfjell, U.S. Pat. No. 3,805,238 for a Method For Identifying Individuals using Selected Characteristics Body Curves. Rothfjell teaches an identification system in which major features (e.g. the shape of a person's nose in profile) are extracted from an image and stored. The stored features are subsequently retrieved and overlaid on a current image of the person to verify identity.

Another early facial recognition patent is Himmel, U.S. Pat. No. 4,020,463 for an Apparatus And A Method For Storage And Retrieval Of Image Patterns. Himmel discloses digitizing a scanned image into binary data which is then compressed and then a sequence of coordinates and vector values are generated which describe the skeletonized image. The coordinates and vector values allow for compact storage of the image and facilitate regeneration of the image.

Yet another is Gotanda, U.S. Pat. No. 4,712,103 for a Door Lock Control System. Gotanda teaches, inter alia, storing a digitized facial image in a non-volatile ROM on a key, and retrieving that image for comparison with a current image of the person at the time he/she request access to a secured area. Gotanda describes the use of image compression, by as much as a factor of four, to reduce the amount of data storage capacity needed by the ROM that is located on the key.

Yet another is Lu, U.S. Pat. No. 4,858,000. Lu teaches an image recognition system and method for identifying ones of a predetermined set of individuals, each of whom has a digital representation of his or her face stored in a defined memory space.

Yet another is Tal, U.S. Pat. No. 4,975,969. Tal teaches an image recognition system and method in which ratios of facial parameters (which Tal defines a distances between definable points on facial features such as a nose, mouth, eyebrow etc.) are measured from a facial image and are used to characterize the individual. Tal, like Lu in U.S. Pat. No. 4,858,000, uses a binary image to find facial features.

Yet another is Lu, U.S. Pat. No. 5,031,228. Lu teaches an image recognition system and method for identifying ones of a predetermined set of individuals, each of whom has a digital representation of his or her face stored in a defined memory space. Face identification data for each of the predetermined individuals are also stored in a Universal Face Model block that includes all the individual pattern images or face signatures stored within the individual face library.

Still another is Burt, U.S. Pat. No. 5,053,603. Burt teaches an image recognition system using differences in facial features to distinguish one individual from another. Burt's system uniquely identifies individuals whose facial images and selected facial feature images have been learned by the system. Burt's system also "generically recognizes" humans and thus distinguishes between unknown humans and non-human objects by using a generic body shape template.

Still another is Turk et al., U.S. Pat. No. 5,164,992. Turk teaches the use of an Eigenface methodology for recognizing and identifying members of a television viewing audience. The Turk system is designed to observe a group of people and identify each of the persons in the group to enable demographics to be incorporated in television ratings determinations.

Still another is Deban et al., U.S. Pat. No. 5,386,103. Deban teaches the use of an Eigenface methodology for encoding a reference face and storing said reference face on a card or the like, then retrieving said reference face and reconstructing it or automatically verifying it by comparing it to a second face acquired at the point of verification. Deban teaches the use of this system in providing security for Automatic Teller Machine (ATM) transactions, check cashing, credit card security and secure facility access.

Yet another is Lu et al., U.S. Pat. No. 5,432,864. Lu teaches the use of an Eigenface methodology for encoding a human facial image and storing it on an "escort memory" for later retrieval or automatic verification. Lu teaches a method and apparatus for employing human facial image verification for financial transactions.

Technologies provided by wireless carriers and cellular phone manufacturers enable the transmission of facial or object images between phones using Multimedia Messaging Services (MMS) as well as to the Internet over Email (Simple Mail Transfer Protocol, SMTP) and Wireless Access Protocol (WAP). Examples of digital wireless devices capable of capturing and receiving images and text are camera phones provided by Nokia, Motorola, LG, Ericsson, and others. Such phones are capable of handling images as JPEGs over MMS, Email, and WAP across many of the wireless carriers: Cingular, T-Mobile, (GSM/GPRS), and Verizon (CDMA) and others.

Neven, U.S. Patent Publication 2005/0185060, for an Image Base Inquiry system For Search Engines For Mobile Telephones With Integrated Camera, discloses a system using a mobile telephone digital camera to send an image to a server that converts the image into symbolic information, such as plain text, and furnishes the user links associated with the image which are provided by search engines.

Neven, et al., U.S. Patent Publication 2006/0012677, for an Image-Based Search Engine For Mobile Phones With Camera, discloses a system that transmits an image of an object to a remote server which generates three confidence values and then only generates a recognition output from the three confidence values, with nothing more. I Adam et al., U.S. Patent Publication 2006/0050933, for a Single Image Based Multi-Biometric System And Method which integrates face, skin and iris recognition to provide a biometric system.

The general public has a fascination with celebrities and many members of the general public use celebrities as a standard for judging some aspect of their life. Many psychiatrists and psychologists believe the confluence of forces coming together in technology and media have led to this celebrity worship factor in our society. One output of this celebrity factor has been a universal approach to compare or determine that someone looks like a certain celebrity. People are constantly stating that someone they meet or know looks like a celebrity, whether it is true or not. What would be helpful would be to scientifically provide a basis for someone to lay claim as looking like a certain celebrity.

BRIEF SUMMARY OF THE INVENTION

The present invention provides a novel method and system for providing the general public an expedient, inexpensive and technologically easy means for determining which celebrity someone looks like.

The invention classifies a person, or whom a person most looks like, by preferably using a digital image captured by a wireless communication device (preferably a mobile telephone) or from a personal computer (PC). The image may be in a JPEG, TIFF, GIF or other standard image format. Further, an analog image may be utilized if digitized. An example is which celebrity most resembles the image that was sent to the application and can be viewed by the user either through their wireless communication device or through a website. The image is sent to the wireless carrier and subsequently sent over the internet to an image classification server. Alternatively, the digital image may be uploaded to a PC from a digital camera or scanner and then sent to the image classification server over the internet.

After an image is received by the image classification server, the image is processed into a feature vector, which reduces the complexity of the digital image data into a small set of variables that represent the features of the image that are of interest for classification purposes.

The feature vector is compared against existing feature vectors in an image database to find the closest match. The image database preferably contains one or more feature vectors for each target individual.

Once classified, an image of the best matching person, possibly manipulated to emphasize matching characteristics, as well as meta-data associated with the person, sponsored information, similar product, inventory or advertisement is sent back to the user's PC or wireless communication device.

A more detailed explanation of a preferred method of the invention is as follows below. The user captures a digital image with a digital camera enabled wireless communication device, such as a mobile telephone. The compressed digital image is sent to the wireless carrier as a multimedia message (MMS), a short message service ("SMS"), an e-mail (Simple Mail Transfer Protocol ("SMTP")), or wireless application protocol ("WAP") upload. The image is subsequently sent over the internet using HTTP or e-mail to an image classification server. Alternatively, the digital image may be uploaded to a PC from a digital camera, or scanner. Once on the PC, the image can be transferred over the internet to the image classification server as an e-mail attachment, or HTTP upload. The user is the provider of the digital image for classification, and includes, but is not limited to a physical person, machine, or software application.

After the image is received by the image classification server, a feature vector is generated for the image. A feature vector is a small set of variables that represent the features of the image that are of interest for classification purposes. Creation and comparison of features vectors may be queued, and scaled across multiple machines. Alternatively, different feature vectors may be generated for the same image. Alternatively, the feature vectors of several images of the same individual may be combined into a single feature vector. The incoming image, as well as associate features vectors, may be stored for later processing, or added to the image database. For faces, possible feature vector variables are the distance between the eyes, the distance between the center of the eyes, to the chin, the size, and shape of the eyebrows, the hair color, eye color, facial hair if any, and the like.

After the feature vector for an image is created, the feature vector is compared against feature vectors in an image database to find the closest match. Preferably, each image in the image database has a feature vector. Alternatively, feature vectors for the image database are created from a set of faces, typically eight or more digital images at slightly different angles for each individual. Since the target individual's feature vector may be generated from several images, an optional second pass is made to find which of the individual images that were used to create the feature vector for the object best match the incoming image.

Once classified, the matching image's name and associated meta-data is retrieved from the database. Before the response is sent, the best-matching image or incoming image may be further manipulated to emphasize the similarities between the two images. This image manipulation can be automated, or can be done interactively by the user. The matching image's name, meta-data, associated image, and a copy of the incoming image are then sent back to the user's wireless communication device or PC, and also to a web page for the user.

One preferred aspect of the present invention is a method for matching images. The method includes acquiring a facial image of a human. Next, the facial image is transmitted from a sender to a server. Next, the facial image is analyzed at the server to determine if the facial image is acceptable. Next, the facial image is processed to create a processed image. Next, the processed image is compared to a plurality of database processed images. Next, the processed image is matched to a database processed image of the plurality of database processed images to create matched images. Next, a perception value of the matched images is determined at the server site. Then, the matched images and the perception value are transmitted to the sender.

Another aspect of the present invention is a method for matching an unknown image to an image of a celebrity. The method includes wirelessly transmitting an unknown digital facial image of an individual from a mobile communication device over a wireless network to an image classification server. Next, the digital facial image is processed at the image classification server to create a primary feature vector for the digital facial image. Next, the primary feature vector is compared to a plurality of database feature vectors, with each of the plurality of database feature vectors corresponding to a database processed image. Next, a database feature vector is selected that best matches the primary feature vector to create matched images of the unknown digital facial image of the individual and a celebrity. Next, the matched images are transmitted to the mobile communication device.

Yet another aspect of the present invention is a system for matching an unknown facial image of an individual with an image of a celebrity. The system includes a mobile communication device, an image classification server and a wireless network. The mobile communication device includes means for generating a digital facial image of an individual and means for wireless transmitting the digital facial image. The image classification server has means for receiving the digital facial image from the mobile communication device, means for analyzing the digital facial image, means for processing the digital facial image to generate a processed image, means for comparing the processed image to a plurality of database processed images, means for matching the processed image to a database processed image of the plurality of database processed images to create matched images, means for determining a perception value of the matched images, and means for transmitting the matched images and the confidence value to the mobile communication device. The wireless network allows for transmissions between the mobile communication device and the image classification server.

One object is to provide a system using a digitally stored image to find, compare, contrast and identify similar characteristics among two or more individuals. The image can be produced by a digital camera, or digitally scanned from an original, analog image.

Another object is that the system uses the transfer of the image to an application and database accessed via the internet, TCP/IP, WAP, MMS, SMS, or SMTP.

Yet another object is that the internet accessible application is completed via a connection to the internet by a multitude of methods, including but not limited to web browser, WAP Browser, MMS, SMS, and SMTP.

Yet another object is that the image is processed to identify using off-the shelf feature vector recognition software (or as may be developed in the future) and compared with a database of one or more, or a plurality of feature vectors. The database of feature vectors is generated from other images or sources.

Yet another object is that the results of the image comparisons are then displayed to the user by accessing the internet through a web browser, WAP browser, or pushed down to the user using MMS, SMS, and SMTP.

Yet another object is that the browser accessible original image and/or the resulting image matches or comparisons can be viewed by the user using either an internet connected browser, a wireless communication device or through a terminal.

Yet another object is that the application can compare or contrast any plurality of available images. The user may chose the database of images to compare including those made available by the host, created by the user or supplied by third parties.

Yet another object is that the resulting information provided to the user may include third party information, advertisements, banners, pop-ups, or click-through.

Yet another object is that the system can determine the closest match for the user's submitted digital facial image against a database of celebrities, including, but not limited to actors, actresses, musicians, athletes, models, and government officials.

Having briefly described the present invention, the above and further objects, features and advantages thereof will be recognized by those skilled in the pertinent art from the following detailed description of the invention when taken in conjunction with the accompanying drawings.

BRIEF DESCRIPTION OF THE SEVERAL VIEWS OF THE DRAWINGS

FIG. 12 is a Web page of a photo of a celebrity of an embodiment of the present invention.

DETAILED DESCRIPTION OF THE INVENTION

Figure 1:
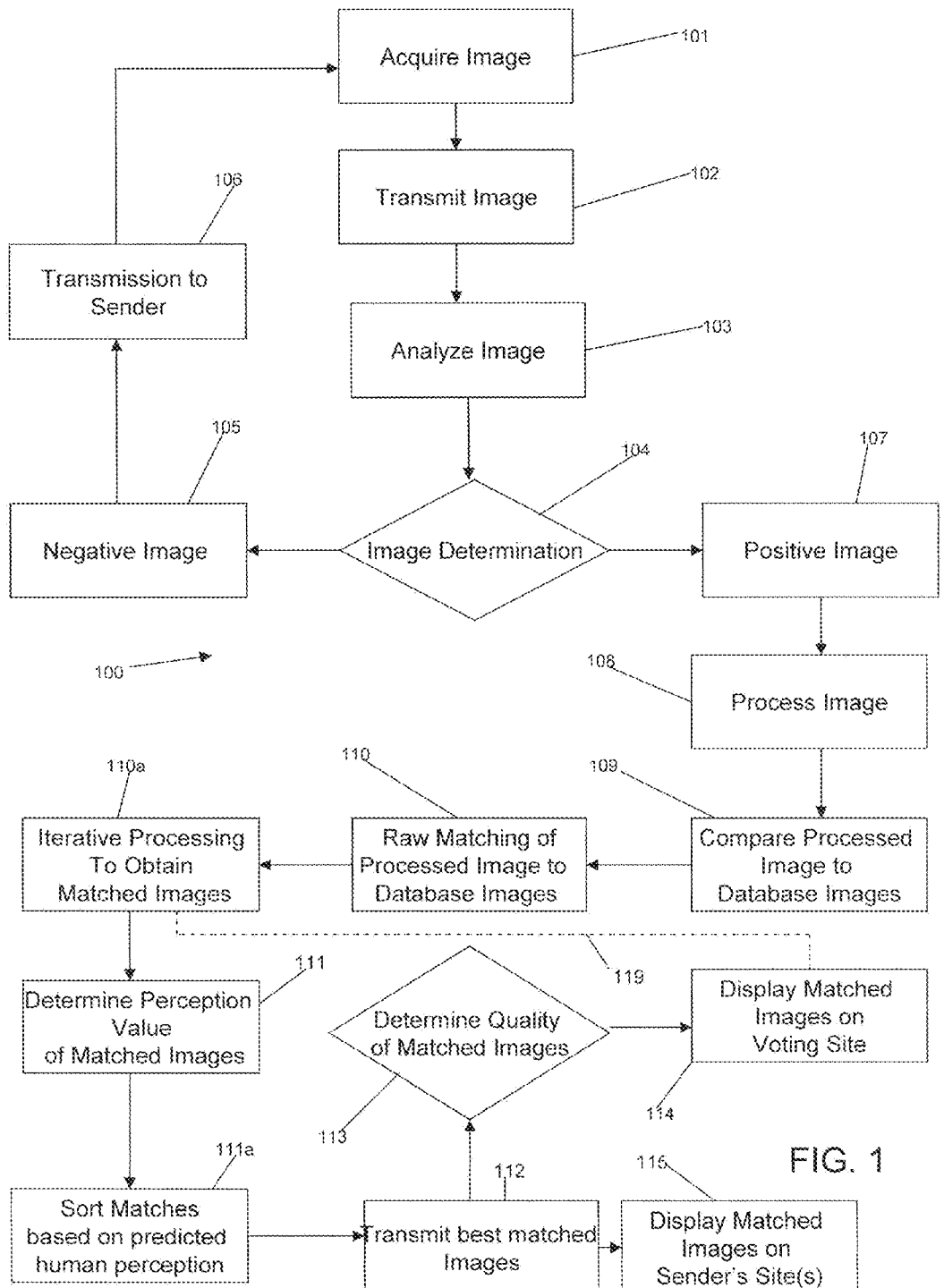
FIG. 1 is a flow chart of a specific method of the present invention.

A flow chart of a preferred specific method of the present invention is illustrated in FIG. 1. The method is generally designated 100 and commences with a facial image of individual being acquired at block 101. The facial image is acquired preferably using a digital camera of a wireless communication device such as a wireless mobile telephone, personal digital assistant ("PDA") or the like. Alternatively, the facial image is acquired from a PC or the like.

At block 102, the facial image is transmitted over a network to an image classification server, preferably over a wireless network. The facial image is preferably sent to a male or female designation site at the image classification server. The facial image is subsequently sent over the internet using HTTP or e-mail to the image classification server. The facial image, preferably a compressed digital facial image such as a JPEG image, is sent to a wireless carrier as a MMS, a SMS, a SMTP, or WAP upload. Alternatively, the facial image is uploaded to a PC from a digital camera, or scanner and then transferred over the internet to the image classification server as an e-mail attachment, or HTTP upload.

At block 103, the facial image is analyzed at the image classifications server to determine if the facial image is of adequate quality to be processed for matching. Quality issues with the facial image include but are not limited to a poor pose angle, brightness, shading, eyes closed, sunglasses worn, obscured facial features, or the like. At block 104, an image determination is made concerning the quality of the image. A negative image determination is made at block 105. At block 106, a transmission is sent to the sender informing then sender that the facial image provided is inadequate and requesting that the sender provide a new facial image. The matching procedure for such a negative image may continue, and the matched images will be sent with an additional statement informing the sender that the image was of bad quality and that a better match may be possible with a higher quality image.

At block 107, if the facial image is positive, then the facial image is processed at block 108. It should be noted that the facial image is previously unknown to the image classification and is the first time that the facial image has been analyzed by the image classification server. Thus, the method of present invention involves processing an unknown image to find a match with facial images of other individuals, which is unlike typical facial recognition systems which involve matching an image of an individual with a known image of the individual in the database. At block 108, processing of image preferably comprises using an algorithm which includes a principle component analysis technique to process the face of the facial image into an average of a multitude of faces, otherwise known as the principle component and a set of images that are the variance from the average face image known as the additional components. Each is reconstructed by multiplying the principal components and the additional components against a feature vector and adding the resulting images together. The resulting image reconstructs the original face of the facial image. Processing of the facial image comprises factors such as facial hair, hair style, facial expression, the presence of accessories such as sunglasses, hair color, eye color, and the like. Essentially a primary feature vector is created for the facial image.

At block 109, processed image or primary feature vector is compared to a plurality of database processed images preferably located at the image classification server. During the comparison, the primary feature vector is compared a plurality of database feature vectors which represent the plurality of database processed images. The database preferably includes at least 10,000 processed images, more preferably at least 50,000 processed images, and most preferably from 50,000 processed images to 100,000 processed images. Those skilled in the pertinent art will recognize that the database may contain any number of images without departing from the scope and spirit of the present invention. The processed images preferably include multiple images of one individual, typically from two to twenty images, more preferably from four to ten images of a single individual in different poses, different facial expressions, different hair styles and the like. The database of processed images preferably includes celebrities, including, but not limited to actors, actresses, musicians, athletes, models, government officials, and other publicly well-known individuals. Again, it should be noted that the facial image sent by the sender is an unknown image which is being best matched to a known image.

At block 110, the processed image undergoes raw matching of a small plurality of database images with each having a feature vector value that is close to the value of the primary feature vector. At block 110a, the iterative processing of the raw matching is performed wherein the human perception of what is a good match is one of the primary factors in creating the matched images. At block 111, a perception value for the matched images is determined based on the feature vector values. The perception value ranges from 0% to 100%, with 100% being an ideal match. At block 111*a*, the matches are sorted based on predicted human perception.

At block 112, the matched images and the perception value are transmitted to the sender over a network as discussed above for the initial transmission. The entire process preferably occurs within a time period of sixty seconds, and most preferably within a time of ten seconds. The process may be delayed due to the wireless carrier, and network carrier. In this manner, the sender will know which celebrity the facial image best matches. The output of the matched images and any additional text is preferably sent to the sender's wireless communication device for instantaneous feedback of their inquiry of which celebrity does the facial image look like. Further, the output is also sent to a sender's web page on a web site hosted through the image classification server wherein the sender can control access to the sender's web page and modify the matched images and the additional text. Further, the output is sent to a voting site as discussed below.

At decision 113, the quality of the matched images is determined to decide if the matched images should be sent to voting site on the web site. At block 115, the matched images are sent to the sender's wireless communication device, the sender's web page on the web site for viewing by the sender and other viewers determined by the sender. At block 114, the matched images are sent to the voting site if of sufficient quality, preferably based on the perception value, to be voted upon by visitors to the voting site.

In this manner, a statistical modeling element is added to the matching process to better match images based on human perception as determined by the scores for previously matched images on the voting site. In other embodiments regression analysis or Bayesian analysis is utilized. Under this alternative scenario, a Support Vector Machine, preferably a high-dimensional neural network, with two feature vectors of a match, along with average vote scores collected from viewers of the web site will be utilized to provide better matching of images. A more detailed explanation of a Support Vector Machine is set forth in Cortes & Vapnik, *Support Vector Networks, Machine Learning*, 20, 1995, which is hereby incorporated by reference in its entirety. The previous voting patterns are implemented in a statistical model for the algorithm to capture the human perception element to better match images as perceived by humans.

Figure 2:
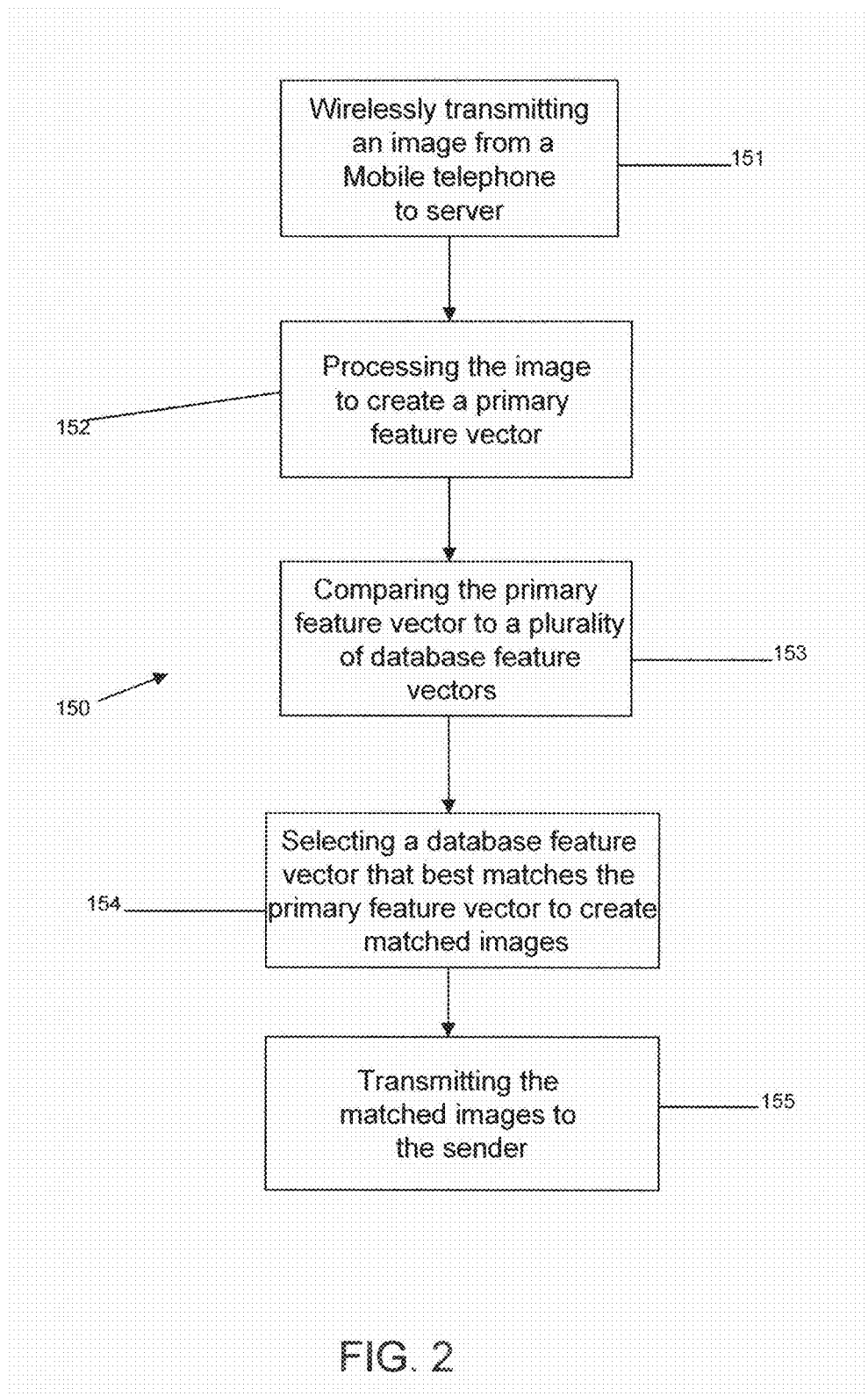
FIG. 2 is a flow chart of a general method of the present invention.

A more general method of the present invention is illustrated in FIG. 2. The general method is designated 150. At block 151, an unknown image from a wireless communication device such as a mobile telephone is transmitted from a sender to an image classification server over a network such as a wireless network with subsequent internet transmission. At block 152, the unknown image is processed to create a primary feature vector such as discussed above. At block 153, the primary feature vector value is compared to a plurality of database feature vectors. At block 154, a database feature vector that best matches the primary feature vector is selected to create matched images. At block 155, the matched images are transmitted to the sender, along with a confidence value and other information about the matching image.

Figure 3:
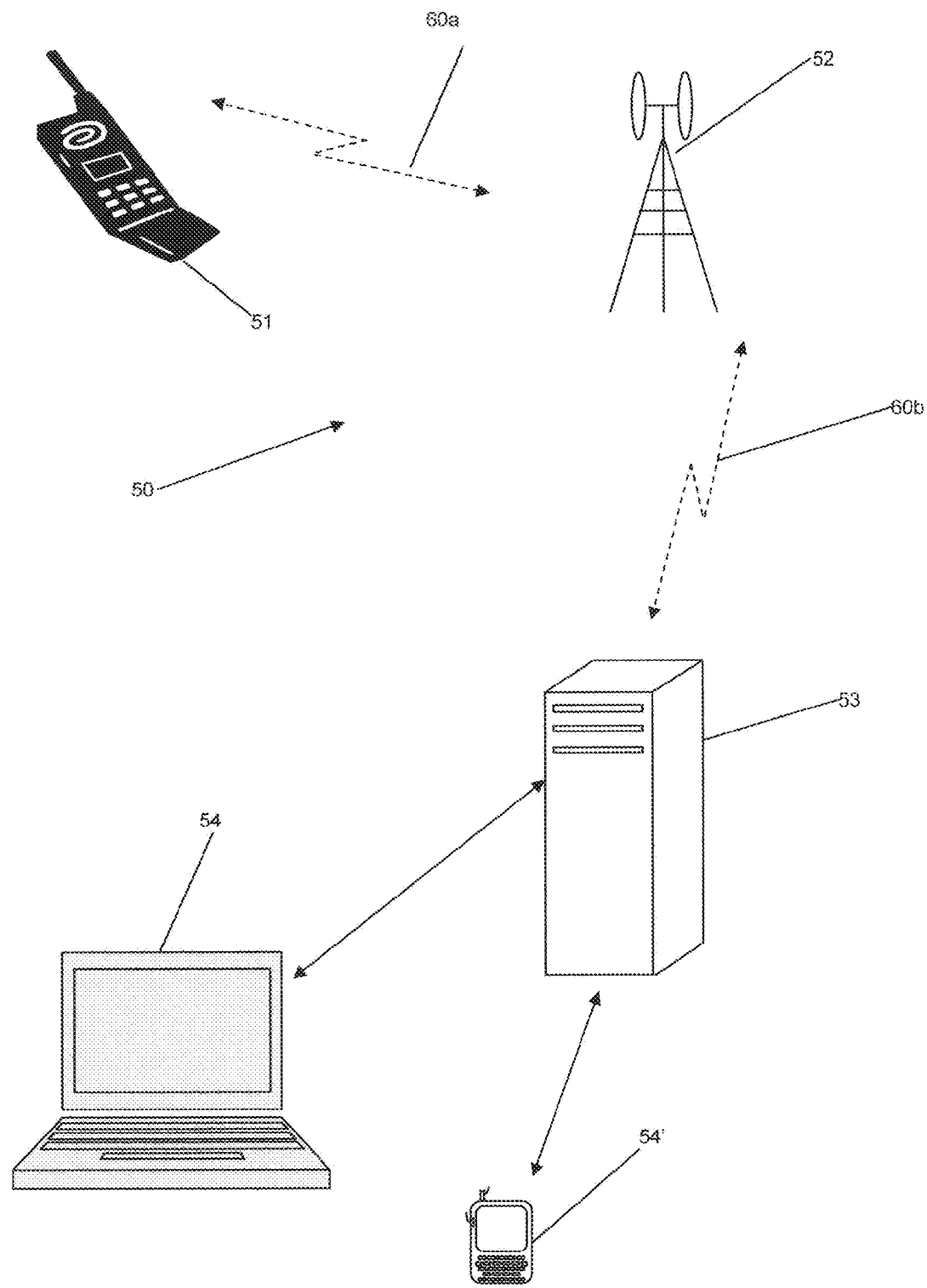
FIG. 3 is a schematic diagram of a system of the present invention.

A system of the present invention is illustrated in FIG. 3. The system is generally designated 50. The system 50 preferably comprises a wireless communication device 51, a wireless network 52, an image classification server 53 and a web site 55, not shown, which may be viewed on a computer 54 or alternate wireless communication device 54' with internet access. The wireless communication device preferably comprises means for generating a digital facial image of an individual and means for wirelessly transmitting the digital facial image over a wireless network. The image classification server 53 preferably comprises means for analyzing the digital facial image, means for processing the digital facial image to generate a processed image, means for comparing the processed image to a plurality of database processed images, means for matching the processed image to a database processed image to create matched images, means for determining a perception value, means for applying a statistical model based on human perception as determined by user's votes of previous third party matched images, and means for transmitting the matched images and the perception value to the wireless communication device.

The present invention preferably uses facial recognition software commercially or publicly available such as the FACEIT brand software from IDENTIX, the FACEVACS brand software from COGNETIC, and others. Those skilled in the pertinent art will recognize that there are many facial recognition softwares, including those in the public domain, that may be used without departing from the scope and spirit of the present invention.

Figure 3A:
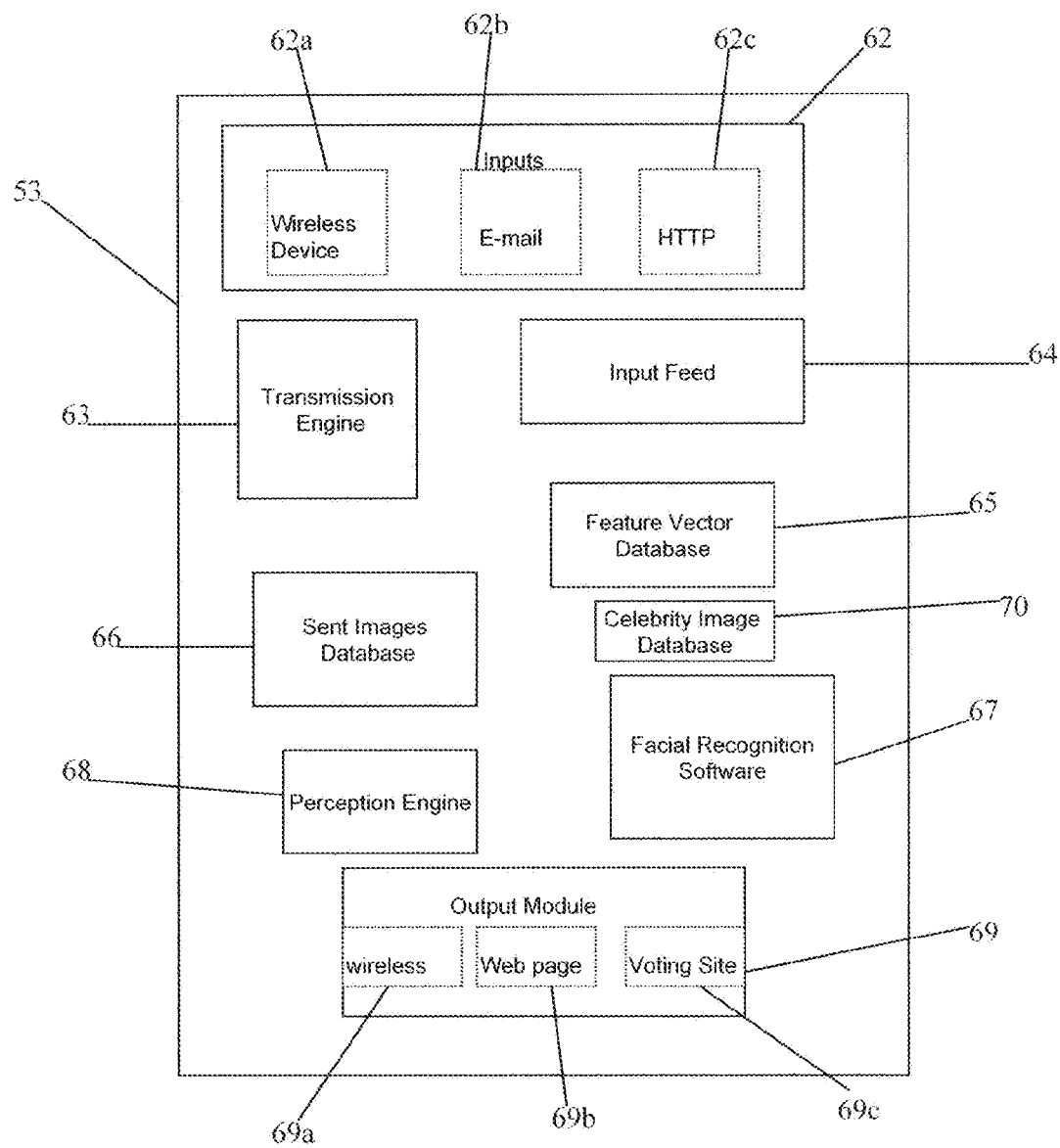
FIG. 3A is a schematic representation of the image classification server of the present invention.

The operational components of the image classification server 53 are schematically shown in FIG. 3A. The image classification server 53 preferably comprises an input module 62, transmission engine 63, input feed 64, feature vector database 65, sent images database 66, facial recognition software 67, perception engine 68, output module 69 and the celebrity image database 70. The input module 62 is further partitioned into wireless device inputs 62*a*, e-mail inputs 62*b* and HTTP (internet) inputs 62*c*. The output module 69 is further partitioned into wireless device outputs 69*a*, a sender's web page output 69*b* and a voting web page output 69*c*. The feature vector database 65 is the database of processed images of the celebrities from which the previously unknown facial image is matched with one of the processed images. The celebrity image database is a database of the actual images of celebrities which are sent as outputs for the matched images. Such image databases are commercially available from sources such as Photorazzi. The sent images database 66 is a database of all of the images sent in from users/senders to be matched with the processed images. The perception engine 68 imparts the human perception processing to the matching procedure.

Figure 4:
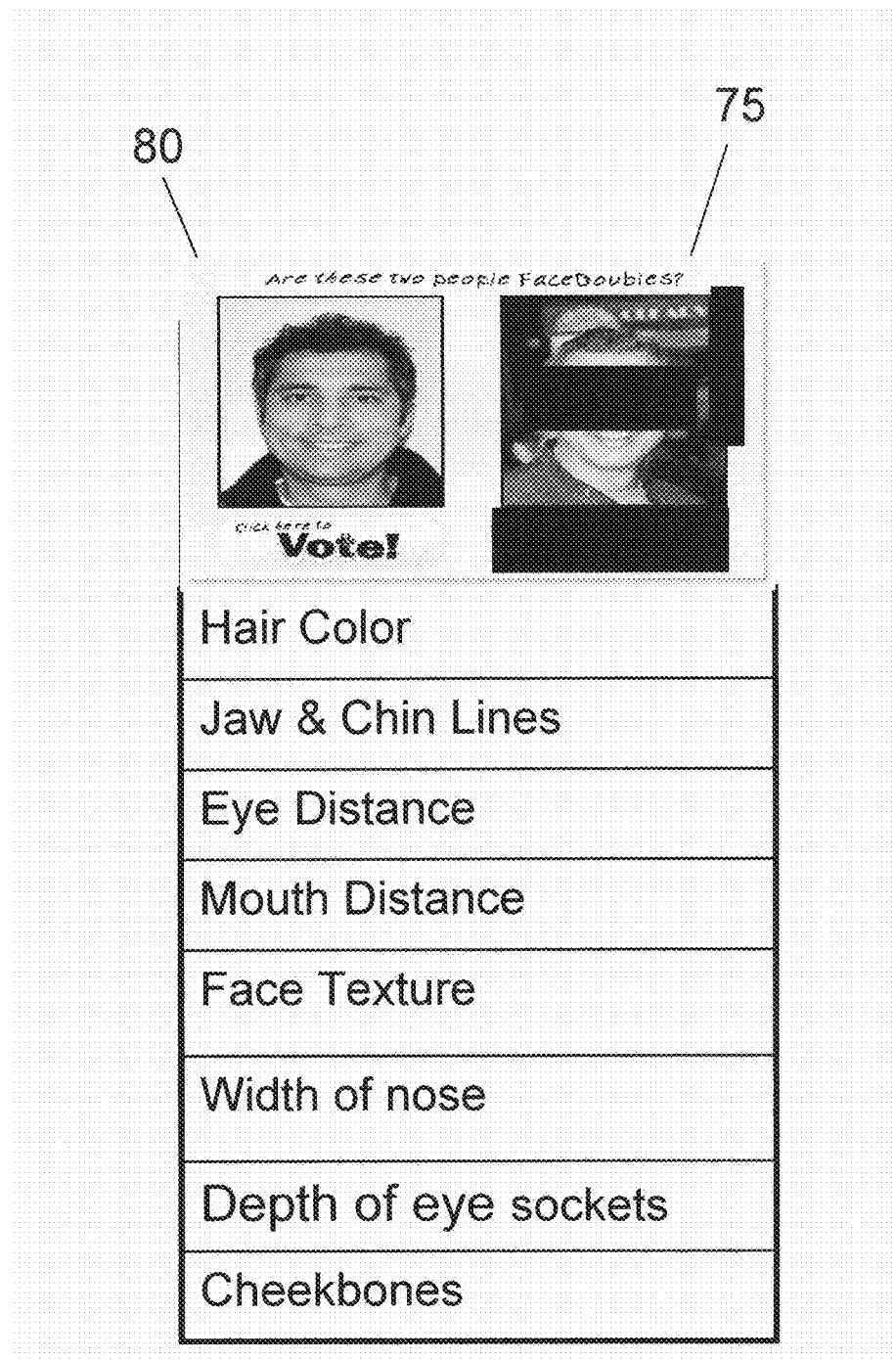
FIG. 4 is image and table comparison of an unknown image and a celebrity image.

As shown in FIG. 4, an unknown facial image 80 sent by an individual is matched to a celebrity image 75 selected from the database of processed images using a method of the present invention as set forth above. The table provides a comparison of the facial values for each of the images.

The present invention collects votes on match results for two primary purposes: 1) determine which matches are the best according to human perception; and 2) use the human perception measurement to improve the matching algorithm of the present invention.

Votes are cast anonymously from preferably the internet and/or mobile telephones and similar communication devices. In order to develop a more consistent measurement of human perception for a particular match, a weighted average is used for the match. The weighted average is calculated as follows:

$$W = R\frac{v}{v+m} + C\frac{m}{v+m}$$

W=Weighted Rating
R=average for the movie as a number from 0 to 10 (mean)=(Rating)
v=number of votes for the movie=(votes)
m=minimum votes required (currently 10)
C=the mean vote (currently 5)

The "Weighted Rating" tends to equal 5 (the median) when few votes have been cast. As more votes are cast the rating will gradually shift away from the median (5) and towards the average vote. A preferred method of calculating weighted rating is disclosed at www.IMDB.com.

The present invention uses voting results to improve selection of images for enrollment. Enrollment is preferably defined as creating a feature vector on a celebrity image and adding that celebrity image feature vector into the database.

Figure 5:
FIG. 5 is an illustration of a matched image of a source image and a database image.
Figure 6:
FIG. 6 is an illustration of a source image and multiple database images.

Match ratings are applied to the matching algorithm as set forth below. The best matches by vote are used to build a test set. For example as shown in FIG. 5, a test set includes a source image and a celebrity match are shown. For each match in the test set, the source image from the best match is fed into the matching algorithm, and the top 10 closest matches for that source image are determined as shown in FIG. 6 The fitness of the match is calculated by finding the "good" Actor Match as determined by the test set, in the list of the top ten matches and weighting it based on match position:

$$f(i) = \frac{1}{1.5^{x_0}} + \frac{1}{1.5^{x_1}} + \ldots$$

where $x_0$, $x_1$, etc. is match position. In the example above, the match only appears in position 0, so the $f(0)=1$. If the matched actor had appeared in position 0, and 2 for example, the fitness would be:

$$f(0) = \frac{1}{1.5^0} + \frac{1}{1.5^2} = 1.44$$

Figure 7:
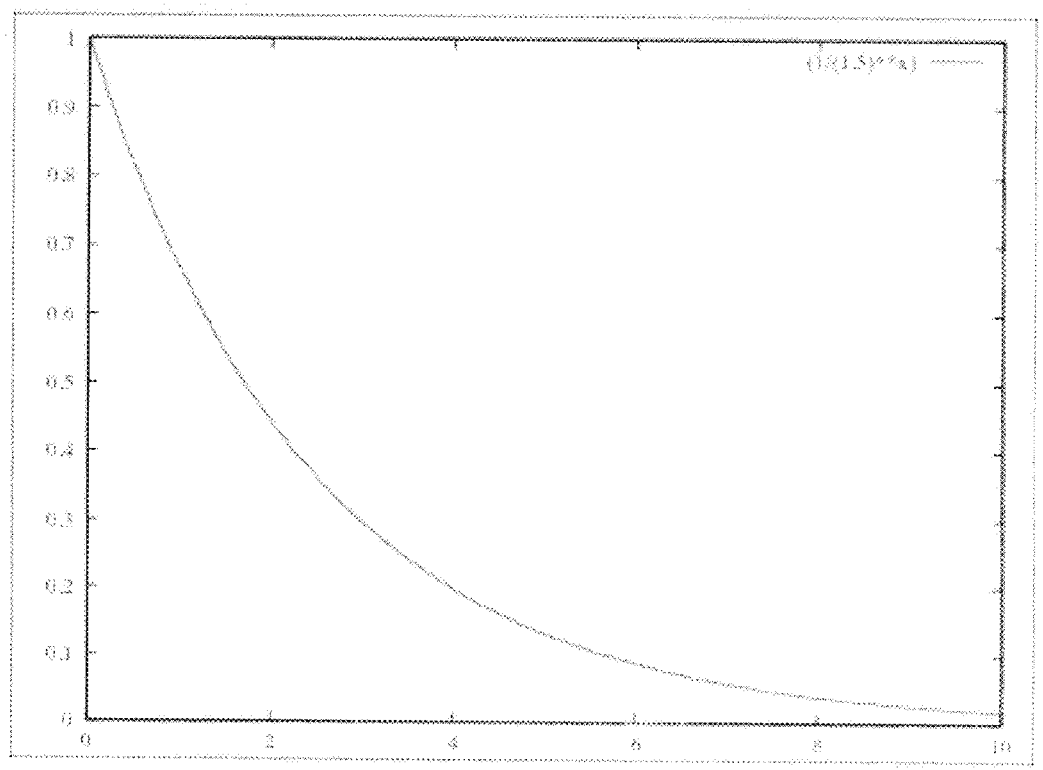
FIG. 7 is a graph of the fitness function.

The total fitness is calculated by summing the fitness for each match in the test set:

$$F = \sum_{i=0}^{n} f(i)$$

where F is the total fitness, n is the number of matches in the test set, as shown in the graph in FIG. 7.

Enrollment parameters are adjusted until the fitness function (F) is maximized. Enrollment parameters are a set of thresholds which determine if an image of the actor should be used to create a feature vector and added to the database of target feature vectors that are matched against. The choice of which feature vectors are kept help improve the algorithm results. These enrollment parameters measure the quality of image, such as resolution, focus, brightness, exposure, shades of gray, confidence of eye detector, etc. If enrollment parameters are chosen too strictly, then the variation of feature vectors is insufficient in the database for each actor, and good matches are not found. If all images for an actor are used, too many variations of feature vectors exist and the good matches cannot be found. By optimizing the choice of enrollment parameters based on human perception voting, we get the set of feature vectors for an actor that best represent the actor by as perceived by people.

The present invention also uses voting results to weigh feature vectors. In addition to using vote results to select which actor images are good for enrollment, vote results can also be used to weigh the feature vector itself so that qualities of the image that are perceived by humans are more heavily weighted when searching for a good match. Biometric security software (Cognitec, Identix, etc.) selects and weighs the features of an image in order to match an image of a person to another image of the same person and optimizing the vector to achieve this result. The feature vector can be made up of local facial features, or overall components of the face as determined by principle component analysis.

The use of human perception voting results in order to optimize the look-a-likeness of a person to a different person can use used, regardless of the how the feature vectors are determined. In other words, the algorithm for determining the set of feature vectors that best represent a face can be augmented with a $2^{nd}$ algorithm which takes these feature vectors, typically represented as a vector of floating point numbers, and weighs the values in the vector so that the characteristics of the image that are based on human perception are used more heavily.

Statistical methods such as neural networks or support vector machines (SVMs) can be used to feed the source and actor feature vectors and predict the human perception vote.

Figure 8:
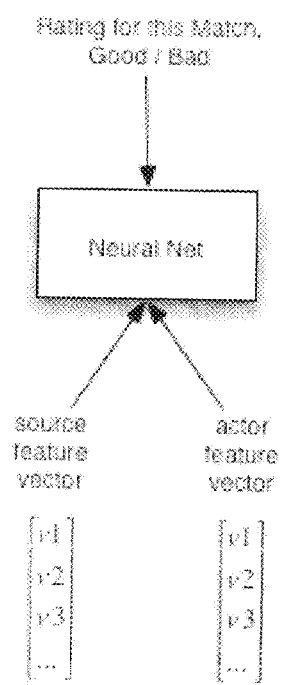
FIG. 8 is an illustration of a training of a support vector machine.
Figure 9:
FIG. 9 is a Web page of up-loaded photos from a user of an embodiment of the present invention.

FIG. 8 shows one possible scenario where the feature vector from the source image and the feature vector from the actor image are feed into a neural network which is trained on the human perception rating for the match. Given many matches and corresponding votes, the neural network can weigh the input vector values, v1, v2, etc. and see which of these feature vector components are statistically relevant to the determination of the human vote or rating.

Once trained, the Neural Network or SVM can predict whether a match is good or not by using the feature vectors, determined from a separate algorithm.

Figure 10:
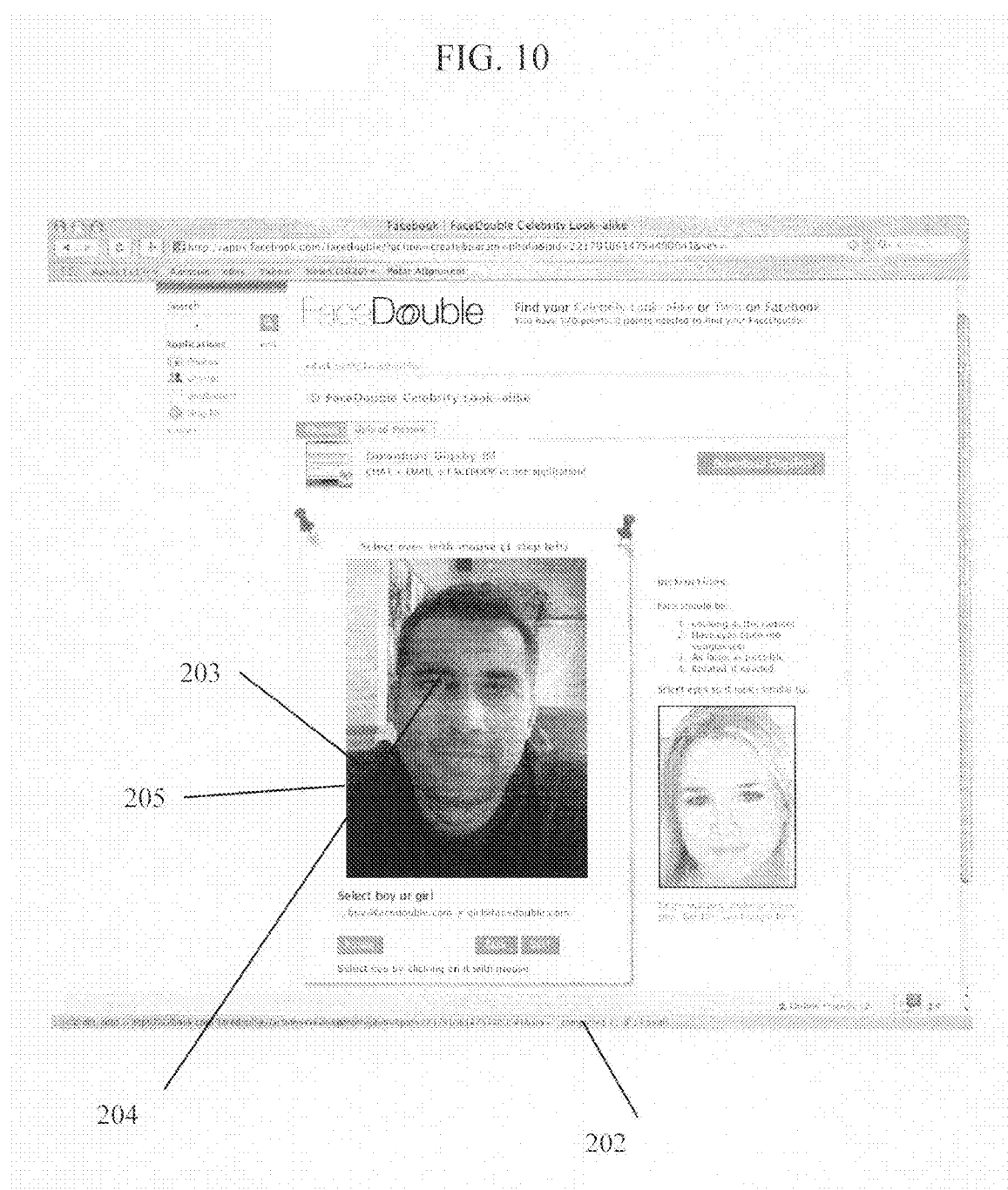
FIG. 10 is Web page of an eye verification of a photo of an embodiment of the present invention.
Figure 11:
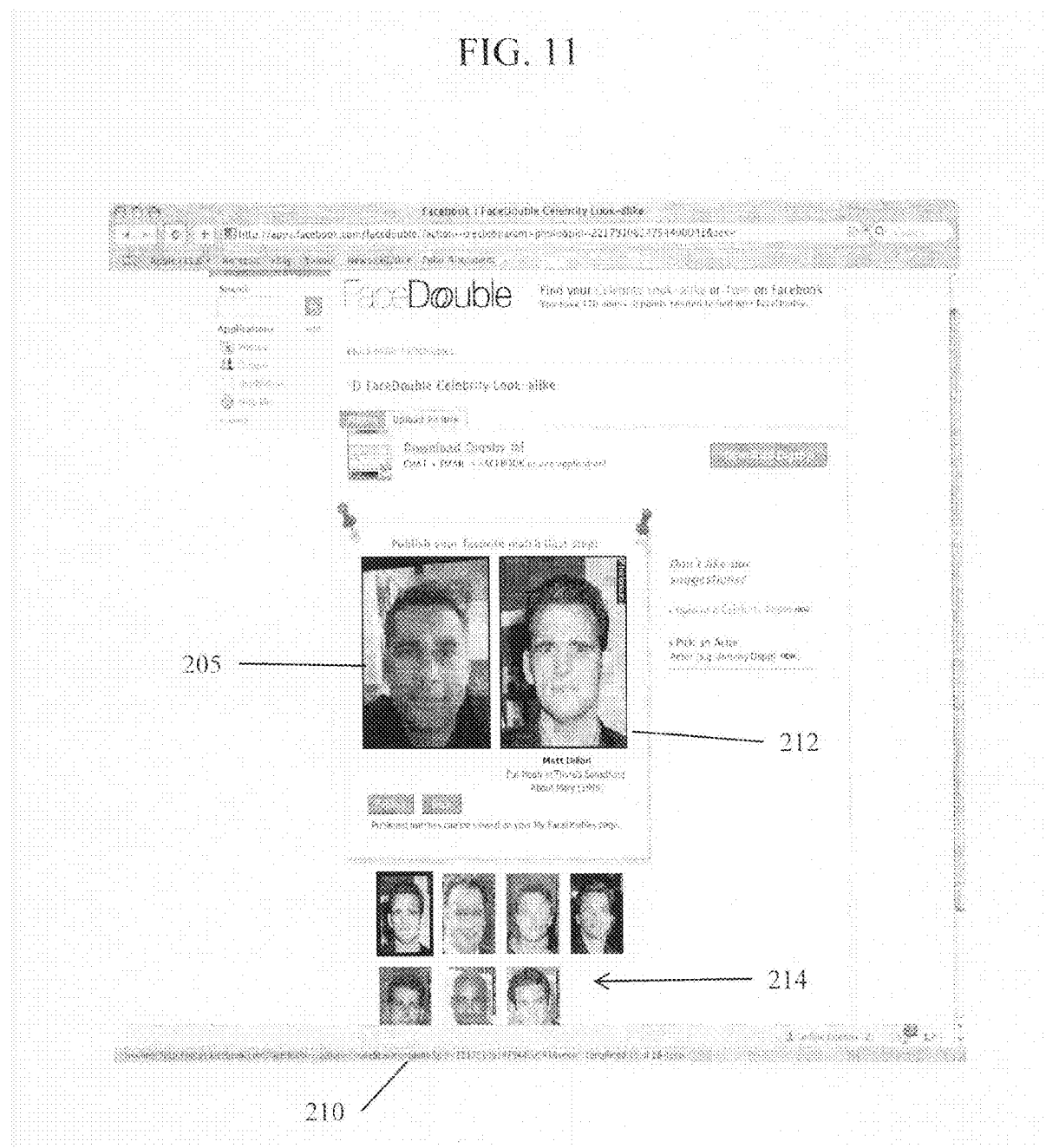
FIG. 11 is a Web page of possible matches of photos of an embodiment of the present invention.
Figure 13:
FIG. 13 is a Web page of a published match.
Figure 14:
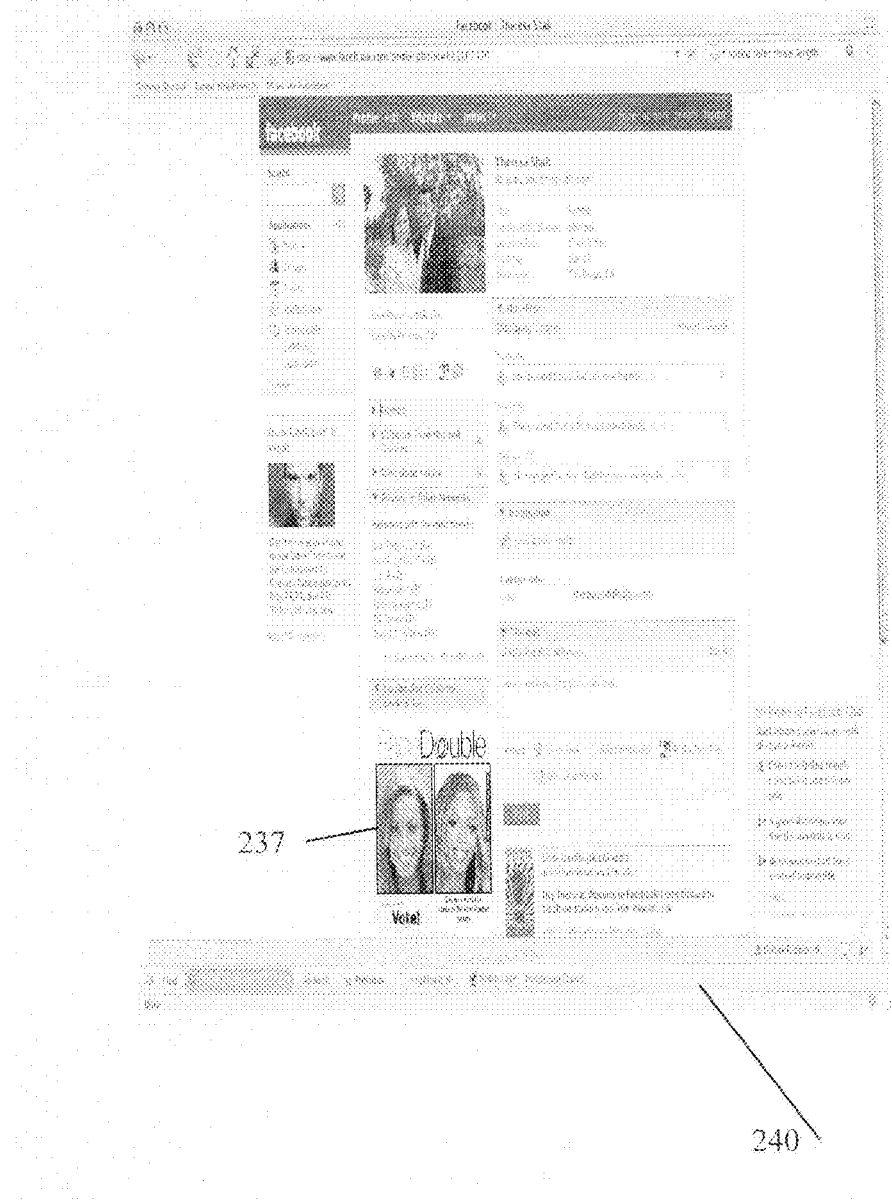
FIG. 14 is a Web page of a user's Web page on a Web site of an embodiment of the present invention.
Figure 15:
FIG. 15 is a Web page of a match published for voting to obtain human perception data.

An example of an embodiment of the present invention is provided in FIGS. 9-15. As shown on FIG. 9, a user uploads photos to the FaceDouble Web site which are placed on a user's Web page 200. As shown in FIG. 10, on another Web page 202, the user uses a computer mouse to select the eyes 104 of an individual 203 in a selected image 205 in one of the uploaded photos. The user selects the eyes 204 of the individual by clicking on the eyes 204 using the computer mouse. As shown in FIG. 11, on another Web page 210, the user selects a celebrity photo 212 from multiple photos 214 of a first set of celebrities provided by the system stored in a database. The user selects the photo 212 that the user believes best matches the individual 203 in the selected image 205. As shown in FIG. 12, on another Web page 220, if the user does not like the available photo 212, the user may select another set of celebrities, search for a particular celebrity, or provide a photo that the user has in the user's possession. As shown in FIG. 13, the user publishes the match 235 on a voting Web page 230 of a FaceDouble Web site, and the user invites others to vote on the selected match 235. The system obtains human perception results based on the voting. As shown in FIG. 14, matches 237 appear on a user's Web page 240 on a social networking Web site like www.facebook.com. As shown in FIG. 15, votes concerning a published match 255 are collected on a voting Web page 250 of the FaceDouble Web site.

Preferably up to twenty votes are collected for each match. If the rating falls below a predetermined threshold, the match is removed form the voting queue of the FaceDouble Web site. However, friends of the user that has provided the match can still vote on the match on the user's Web page.

Code for the voting is as follows: # updateVote(score, facedoubleId) 'updateVote'=>UPDATE votes SET score=score+?, nvotes=nvotes+1,
 rank=CAST((CAST((score+50) AS DECIMAL)/(nvotes+10)) AS DECIMAL) WHERE facedoubleid=?
Table One provides sample data for the voting:

TABLE ONE

| FACEDOUBLE Id | Score | nvotes | rank | funny | Funny votes | Funny rank |
|---|---|---|---|---|---|---|
| 0 | 62 | 81 | 1.23 | −1 | 1 | 0.71 |
| 59 | 1183 | 188 | 6.23 | 2 | 1 | 0.48 |
| 60 | 1783 | 368 | 4.85 | 0 | 0 | 0 |
| 62 | 1323 | 303 | 4.39 | 0 | 0 | 0 |
| 63 | 484 | 99 | 4.9 | 0 | 0 | 0 |
| 64 | 85 | 20 | 4.5 | 0 | 0 | 0 |
| 65 | 62 | 16 | 4.31 | 0 | 0 | 0 |
| 66 | 821 | 162 | 5.06 | 0 | 0 | 0 |
| 67 | 212 | 45 | 4.76 | 0 | 0 | 0 |
| 68 | 83 | 20 | 4.43 | 0 | 0 | 0 |

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes modification and substitutions of equivalents may be made therein without departing from the spirit and scope of this invention which is intended to be unlimited by the foregoing except as may appear in the following appended claim. Therefore, the embodiments of the invention in which an exclusive property or privilege is claimed are defined in the following appended claims.

We claim as our invention:

1. A method for matching an unknown image with a known image, the method comprising:
 transmitting an unknown facial image over a cellular network acquired from a mobile communication device to an image classification server;
 analyzing the facial image at the image classification server to determine if the unknown facial image is acceptable;
 processing the unknown facial image to create a processed image;
 comparing the processed image to a plurality of database processed images;
 matching the processed image to a database processed image of the plurality of database processed images to create matched images, wherein the matched images comprises the unknown digital facial image and a database processed, wherein the database processed image is another facial image;
 determining a perception value of the matched images; and
 transmitting the matched images and the perception value to the sender over the Internet.

2. The method according to claim 1 wherein the processed image is processed as a primary feature vector and the plurality of database processed images is a plurality of database feature vectors, and wherein comparing the processed image to a plurality of database processed images comprises comparing the primary feature vector to each of the plurality of database feature vectors.

3. The method according to claim 2 wherein matching the processed image to a database processed image of the plurality of database processed images to create matched images comprises selecting a database feature vector with a value that is most similar to the value of the primary feature vector.

4. The method according to claim 1 wherein the plurality of database processed images comprises at least 10,000 database processed images.

5. The method according to claim 2 wherein comparing the processed image to a plurality of database processed images further comprises applying a statistical model based on human perception as determined by user's votes of previous third party matched images.

6. The method according to claim 1 wherein the plurality of database processed images comprises from 50,000 database processed images to 100,000 database processed images.

7. The method according to claim 1 wherein the method occurs within a time period of 60 seconds.

8. The method according to claim 1 further comprising filtering the database processed image to provide a preferred database processed image for the matched images.

9. The method according to claim 2 wherein the primary feature vector and each of the plurality of database feature vectors are based on a plurality of factors comprising facial expression, hair style, hair color, facial pose, eye color, texture of the face, color of the face and facial hair.

10. The method according to claim 1 wherein image classification server comprises an input module, a transmission engine, facial recognition software, an input feed, a feature vector database, a perception engine and an output module.

11. The method according to claim 1 wherein the matched images and perception value are transmitted to a sender's web page on a web site.

12. The method according to claim 1 wherein the perception value ranges from 0% to 100%.

13. The method according to claim 1 wherein analyzing the unknown facial image at the image classification server comprises determining if a plurality of facial image factors are acceptable, the plurality of facial image factors comprising the lack of a facial image, the lack of eyes, uneven lighting, the brightness of the facial image, pose angle of the facial image, relative size of the facial image and pixel strength of the facial image.

14. A method for matching an unknown image with a known image, the method comprising:
 acquiring on a mobile communication device an unknown digital facial image of an individual;
 wirelessly transmitting the unknown digital facial image from the mobile communication device over a wireless network to an image classification server;
 processing the digital facial image at the image classification server to create a primary feature vector for the digital facial image;
 comparing the primary feature vector to a plurality of database feature vectors, each of the plurality of database feature vectors corresponding to a database processed image;
 selecting a database feature vector that best matches the primary feature vector to create matched images, wherein the matched images comprises the unknown digital facial image and a database processed; and
 transmitting the matched images to the mobile communication device.

15. A method for matching images, the method comprising:
 receiving a digital facial image from a mobile communication device over a wireless network at an image classification server;
 processing the digital facial image at the image classification server to create a primary feature vector for the digital facial image;

comparing the primary feature vector to a plurality of database feature vectors, each of the plurality of database feature vectors corresponding to a database processed image;

obtaining matched images from the primary feature vector and database feature vectors, wherein the matched images comprises the unknown digital facial image and a database processed;

sorting the matched images based on predicted human perception;

transmitting the best matched images from the image classification server to the user.

16. The method according to claim 15 wherein sorting the matched images based on human perception comprises analyzing voting results for the matched images.

* * * * *